United States Patent [19]

Okada et al.

[11] Patent Number: 5,473,387

[45] Date of Patent: Dec. 5, 1995

[54] FIELD DECISION CIRCUIT

[75] Inventors: Hisao Okada, Nara; Yuji Yamamoto, Kobe, both of Japan

[73] Assignee: Sharp Kabushiki Kaisha, Osaka, Japan

[21] Appl. No.: 197,179

[22] Filed: Feb. 16, 1994

[30] Foreign Application Priority Data

Feb. 16, 1993 [JP] Japan .................................. 5-027013

[51] Int. Cl.$^6$ .............................. H04N 5/10; H04N 5/08
[52] U.S. Cl. ......................................................... 348/526
[58] Field of Search ................................ 348/526, 525, 348/550, 500, 459, 441, 911, 493, 521; 358/324, 320, 313, 337; 345/99, 96, 213; H04N 5/04, 5/06, 5/00, 5/08, 5/10

[56] References Cited

U.S. PATENT DOCUMENTS

| | | | |
|---|---|---|---|
| 4,858,008 | 8/1989 | Sieben et al. | 348/526 |
| 5,012,339 | 4/1991 | Kurata et al. | 348/526 |
| 5,025,496 | 6/1991 | Canfield | 348/526 |
| 5,151,786 | 9/1992 | Kawamoto | 348/525 |
| 5,247,359 | 9/1993 | Okada et al. | 348/526 |
| 5,327,175 | 7/1994 | Kim | 348/526 |

FOREIGN PATENT DOCUMENTS 4-138775  5/1992  Japan ............................. H04N 5/10

Primary Examiner—James J. Groody
Assistant Examiner—Safet Metjahic
Attorney, Agent, or Firm—Nixon & Vanderhye

[57] ABSTRACT

The field decision circuit includes: a field information generating circuit for outputting one of a plurality of signals as a first field information for each field in response to a pulse signal; a comparator for outputting a comparison result indicating whether the first field information agrees with second field information from an external circuit for each field; a memory for storing a predetermined number of comparison results over the predetermined number of fields; an evaluation circuit for outputting an evaluation result obtained by evaluating whether the predetermined number of comparison results satisfy a predetermined relationship; and a correction circuit for supplying the pulse signal to the field information generating circuit in accordance with the evaluation result.

4 Claims, 4 Drawing Sheets

FIELD DECISION CIRCUIT

BACKGROUND OF THE INVENTION

1. Field of the Invention:

The present invention relates to a field decision circuit used in a circuit for processing video information, when one frame of video information includes a plurality of fields.

2. Description of the Related Art:

The standards such as NTSC (National Television System Committee) and PAL (Phase Alternation Line) relate to a video signal, when one frame of the video signal includes a plurality of fields. In order to process the video signal according to the standards, a field judgment circuit may be required for specifying which field is currently processed of the plurality of fields. However, it is difficult to completely eliminate any incorrect operation of the field judgment circuit because of noise, variation in the timing of the synchronizing signal, or the like. Further, in driving a flat-type display apparatus which has been recently developed, more particularly, a liquid crystal display device, it is extremely important to correctly judge the field. This is because the judgment result of the field is used as information for determining the position of video information which is to be reproduced on a display panel, and is also indispensable as information for alternating the polarity of voltages applied to pixels.

Japanese Laid-Open Patent Publication No. 4-138775 discloses a conventional field decision circuit for providing correct field information by modifying the incorrect judgment result from the field judgment circuit, when the field judgment circuit operates incorrectly.

FIG. 4 shows a configuration of the conventional field decision circuit. The field decision circuit includes a first memory 41 for storing the output of the field judgment circuit over a predetermined number of fields, a second memory 42 for storing the output of the field decision circuit over the predetermined number of fields, and a comparator 43 for comparing the contents of the first memory 41 with the contents of the second memory 42.

When only the field decision circuit or only the field decision circuit in combination with the field judgment circuit is implemented as an LSI (Large Scale Integration), the number of gates required for the whole circuit(s) is not large. However, when the field decision circuit is used as a part of a video signal processing unit and is implemented in an LSI for the video signal processing unit, the number of gates required for the whole circuit(s) is relatively large. As a result, the number of gates of the field decision circuit possibly influence the cost of the LSI for the video signal processing unit. The influence becomes noticeable when a gate array is used as the LSI for the video signal processing unit.

For example, it is assumed that a gate array having 1,000 gates is used as the LSI for the video signal processing unit. In this case, the number of gates which can be actually used is at most 900 because of restrictions concerning the arrangement of elements and interconnections between elements. In a gate array, since it is common that almost all gates which can be actually used are already used by the existing circuits, it is often difficult to add another circuit requiring many gates to the gate array. Accordingly, in a case where the field decision circuit requires many gates, the number of the required gates possibly exceeds 1,000, which is the maximum allowable number of gates in the gate array.

In a case where the number of required gates exceed 1,000, it is necessary to take additional measures. One measure is to decrease the number of fields to be stored in the field decision circuit so as to decrease the number of gates in the gate array. This makes it possible to decrease the number of memory elements such as flip-flops. Since the memory elements require a relatively large number of gates, the decrease of the number of memory elements causes a great effect to the decrease of the number of gates in the gate array. However, the measures have a drawback in that the reliability of the field decision circuit is degraded. Another measure is to use a ranked-up gate array, for example, a gate array having 2,000 gates, as the LSI for the video signal processing unit. However, this measure has a drawback in that the cost of the LSI becomes high.

SUMMARY OF THE INVENTION

The field decision circuit of this invention, includes: a field information generating circuit for outputting one of a plurality of signals as a first field information for each field, the field information generating circuit receiving a pulse signal and, in response to the pulse signal, outputting another one of the plurality of signals as the first field information; a comparator for receiving the first field information generated by the field information generating circuit and second field information from an external circuit, and for outputting a comparison result indicating whether the first field information agrees with the second field information for each field; a memory for storing a predetermined number of comparison results output from the comparator over the predetermined number of fields; an evaluation circuit for receiving the predetermined number of comparison results stored in the memory and for outputting an evaluation result obtained by evaluating whether the predetermined number of comparison results satisfy a predetermined relationship; and a correction circuit for supplying the pulse signal to the field information generating circuit in accordance with the evaluation result.

In one embodiment, the predetermined number of comparison results are successive comparison results including the latest comparison result.

In another embodiment, the predetermined relationship includes a relationship that the first field information and the second field information disagree with each other over the predetermined number of fields.

In another embodiment, the external circuit includes a field judgment circuit for generating the second field information.

Thus, the invention described herein makes possible the advantage of providing a field decision circuit in which the total number of gates is greatly decreased without degrading the reliability thereof.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating an example with reference to the drawings.

Figure 1:
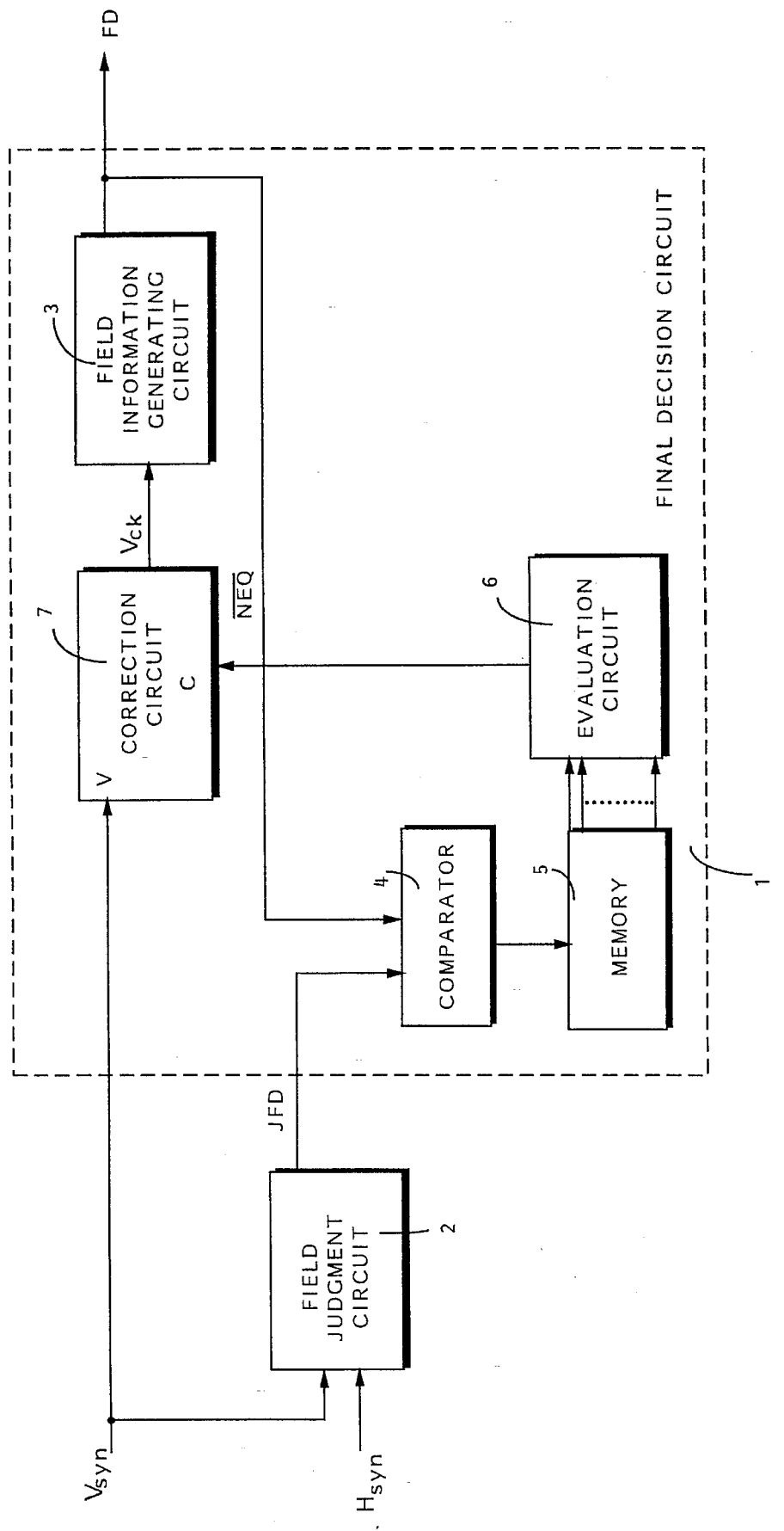
FIG. 1 is a block diagram illustrating a structure of a field decision circuit according to an example of the present invention.

FIG. 1 shows a structure for a field decision circuit 1 according to an example of the present invention. The field decision circuit 1 is connected to the output of a field judgment circuit 2. The field judgment circuit 2 outputs field information JFD based on a vertical synchronizing signal $V_{syn}$ and a horizontal synchronizing signal $H_{syn}$. Herein, the field information means information for indicating which field is currently processed of the plurality of fields.

The field decision circuit 1 includes a field information generating circuit 3 for generating field information FD; a comparator 4 for receiving the field information JFD output from the field judgment circuit 2 and field information FD generated by the field information generating circuit 3 and for comparing the field information JFD with the field information FD; a memory 5 for storing a predetermined number of comparison results of a plurality of comparison results obtained by the comparator 4; an evaluation circuit 6 for evaluating the predetermined number of comparison results stored in the memory 5; and a correction circuit 7 for correcting the field information FD generated by the field information generating circuit 3 in accordance with the evaluation result obtained by the evaluation circuit 6.

The field judgment circuit 2 may be replaced by another external circuit for generating such field information.

Next, the operation of the field decision circuit 1 will be described.

The field information generating circuit 3 outputs one of a predetermined number of signals in a cyclic manner as the field information FD. Specifically, the field information generating circuit 3 receives a pulse signal VCK which will be described later, and outputs another one of the predetermined number of signals as the field information FD in response to the pulse signal VCK. The field information generating circuit 3 continues to output the same signal as the field information FD unless it receives the pulse signal VCK.

For example, in the case where one frame consists of an odd field and an even field, the field information generating circuit 3 alternately outputs "1" corresponding to the odd field, or "0" corresponding to the even field as the field information FD in response to the pulse signal VCK. More specifically, if the field information generating circuit 3 receives the pulse signal VCK during outputting "0" as the field information FD, the field information generating circuit 3 changes the output from "0" to "1". Alternatively, if the field information generating circuit 3 receives the pulse signal VCK during outputting "1" as the field information FD, the field information generating circuit 3 changes the output from "1" to "0". This field information FD is output as the output of the field decision circuit 1.

The comparator 4 compares the field information JFD output from the field judgment circuit 2 with the field information FD generated by the field information generating circuit 3. If the comparator 4 detects that the field information JFD and the field information FD agree with each other, the comparator 4 outputs "0". If the comparator 4 detects that the field information JFD and the field information FD disagree with each other, the comparator 4 outputs "1". The comparison result (0: agree or 1: disagree) of the comparator 4 is conveyed to the memory 5 sequentially.

The memory 5 stores a predetermined number of comparison results of the comparator 4. The predetermined number of comparison results include a comparison result which is output latest from the comparator 4, and corresponds to successive field information.

The evaluation circuit 6 outputs "0" (inactive) only when all of the comparison results stored in the memory 5 are "1" (i.e., when the field information FD and the field information JFD disagree with each other over all of the predetermined number of successive fields), and outputs "1" (active) otherwise.

The correction circuit 7 has an input terminal V and an input terminal C. The correction circuit 7 passes the signal input to the input terminal V when the signal input to the input terminal C is "1" (active), whereas the correction circuit 7 does not pass the signal input to the input terminal V when the signal input to the input terminal C is "0" (inactive). The output $\overline{NEQ}$ of the evaluation circuit 6 is supplied to the input terminal C of the correction circuit 7. The vertical synchronizing signal $V_{syn}$ is supplied to the input terminal V of the correction circuit 7. Alternatively, instead of the vertical synchronizing signal $V_{syn}$, a pulse synchronized with the vertical synchronizing signal $V_{syn}$ may be supplied to the input terminal V of the correction circuit 7. Accordingly, only when the output $\overline{NEQ}$ of the evaluation circuit 6 is "1" (active), the correction circuit 7 generates the pulse signal VCK.

Thus, when the field information JFD output from the field judgement circuit 2 and the field information FD generated by the field information generating circuit 3 disagree with each other over all of the predetermined number of fields, the correction circuit 7 does not generate any pulse signal VCK. As a result, the field information generating circuit 3 does not change the field information FD at a field next to the field which is currently processed, so that the field information FD comes to agree with the field information JFD output from the field judgment circuit 2 at the next field. Accordingly, the field information JFD output from the field judgment circuit 2 and the field information FD output from the field decision circuit 1 agree with each other unless the field judgment circuit 2 operates incorrectly.

Figure 2:
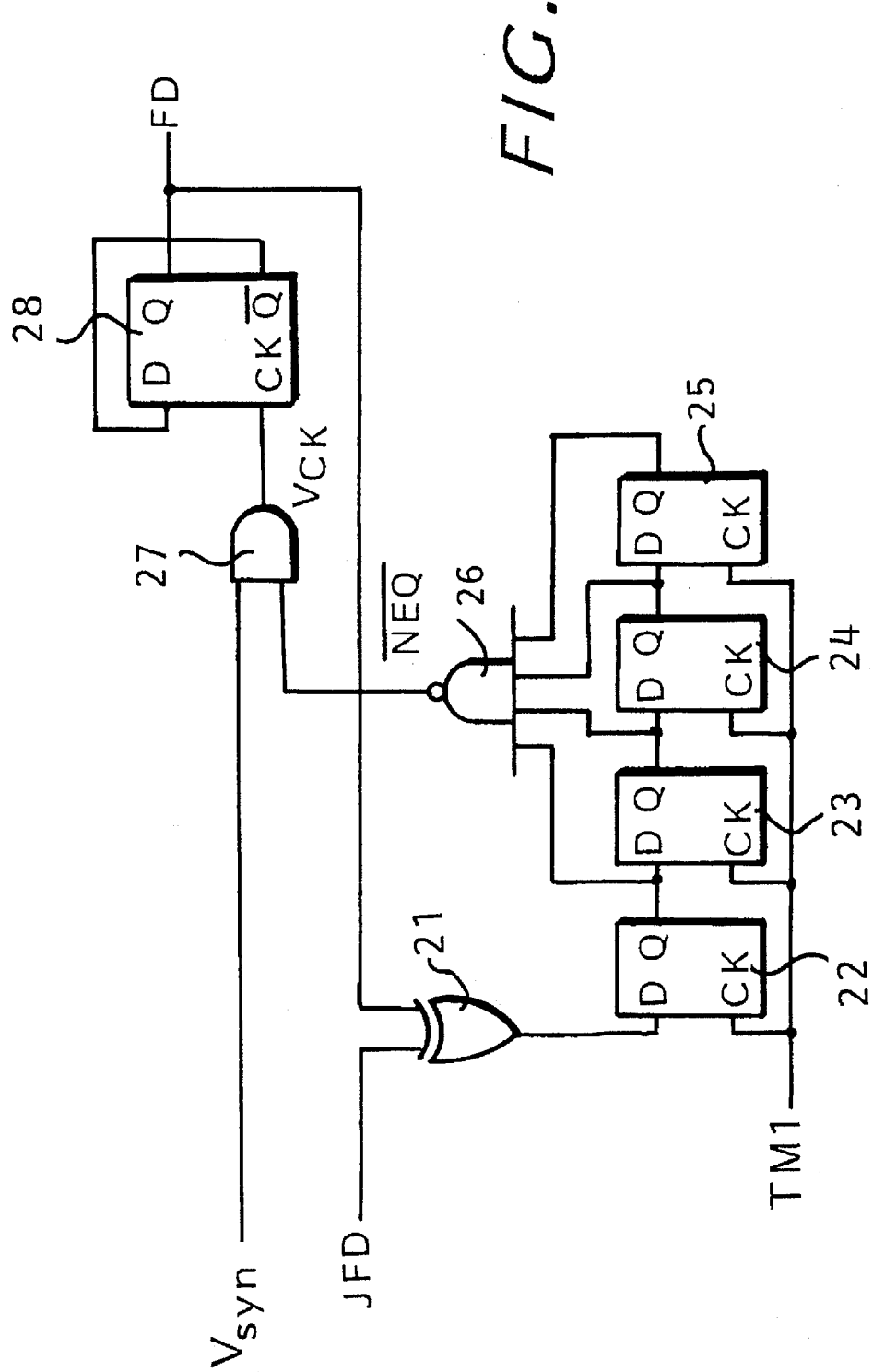
FIG. 2 is a circuit diagram illustrating the structure of the field decision circuit of FIG. 1 in more detail.

FIG. 2 shows a structure of the field decision circuit 1 according to the present example in more detail. For simplicity, it is assumed herein that one frame of video signal consists of an odd field and an even field. Needless to say, the present invention is not limited to a case where one frame of video signal consists of an odd field and an even field, but can be applied in a case where one frame of video signal consists of three or more fields.

Referring to FIG. 2, a D-type flip-flop 28 functions as the field information generating circuit 3 in FIG. 1. Herein, it is assumed that the D-type flip-flop 28 outputs "1" (High) as field information corresponding to the odd field, and outputs "0" (Low) as field information corresponding to the even field. The D-type flip-flop 28 has an input terminal D, an input terminal CK, an output terminal Q and an output terminal $\overline{Q}$. The pulse signal VCK is supplied to the input terminal CK of the D-type flip-flop 28. The D-type flip-flop 28 receives a signal input to the input terminal D in response to the pulse signal VCK input to the input terminal CK, and holds the signal until it receives the next pulse signal VCK. When the D-type flip-flop 28 receives the next pulse signal VCK, the D-type flip-flop 28 outputs the held signal through the output terminal Q and a signal obtained by inverting the held signal through the output terminal $\overline{Q}$. The output terminal $\overline{Q}$ of the D-type flip-flop 28 is connected to the input terminal D thereof. Thus, the D-type flip-flop 28 inverts its output in response to the pulse signal VCK. For example, when the D-type flip-flop 28 inverts an output from "0" to "1" in response to a pulse signal, the D-type flip-flop 28 inverts an output from "1" to "0" in response to the next pulse signal. The D-type flip-flop 28 repeats such an inversion in response to the pulse signal. The D-type flip-flop 28 may be replaced by any other element having a function described above.

In a case where one frame of video signal consists of more than three fields, the field information generating circuit 3 should be modified into a circuit which outputs more than three different values in a cyclic manner in response to the pulse signal VCK. For example, in a case where one frame of video signal consists of four fields, the field information generating circuit 3 may be modified into a circuit which outputs values of 0, 1, 2 and 3 in a cyclic manner in response to the pulse signal VCK.

An exclusive-OR element 21 shown in FIG. 2 functions as the comparator 4 of FIG. 1. The exclusive-OR element 21 receives the field information JFD output from an external circuit and the field information FD output from the flip-flop 28, and outputs the result obtained by performing an exclusive-OR operation between the field information JFD and the field information FD.

A shift register including four D-type flip-flops 22 to 25 shown in FIG. 2 functions as the memory 5 of FIG. 1. More specifically, the output terminal Q of the D-type flip-flop 22 is connected to the input terminal D of the D-type flip-flop 23. The output terminal Q of the D-type flip-flop 23 is connected to the input terminal D of the D-type flip-flop 24. The output terminal Q of the D-type flip-flop 24 is connected to the input terminal D of the D-type flip-flop 25. A signal TM1 is supplied to each input terminal CK of the D-type flip-flops 22 to 25 as a clock signal of the shift register. The input terminal D of the D-type flip-flop 22 is connected to the output of the exclusive-OR element 21.

The signal TM1 is a pulse signal synchronized with the vertical synchronizing signal $V_{syn}$ and having a phase which is different from the phase of the vertical synchronizing signal $V_{syn}$. Each of the D-type flip-flops 22 to 25 holds a value of either logic-0 or logic-1. In response to the rising edge of the signal TM1, the value held by the D-type flip-flop 22 is conveyed to the D-type flip-flop 23. Similarly, in response to the rising edge of the signal TM1, the value held by the D-type flip-flop 23 is conveyed to the D-type flip-flop 24 and the value held by the D-type flip-flop 24 is conveyed to the D-type flip-flop 25. Also, in response to the rising edge of the signal TM1, the output of the exclusive-OR element 21 (i.e., a comparison result obtained by comparing the field information JFD output from the field judgment circuit 2 with the field information FD generated by the field information generating circuit 3) is conveyed to the flip-flop 22. Thus, the D-type flip-flops 22 to 25 hold the comparison results for four successive fields, including the latest comparison result.

An NAND element 26 having four inputs shown in FIG. 2 functions as the evaluation circuit 6 of FIG. 1. The four inputs of the NAND element 26 are connected to the output terminals Q of the D-type flip-flops 22 to 25, respectively. The NAND element 26 receives respective signals output from the respective output terminals Q of the D-type flip-flops 22 to 25, and outputs the result obtained by performing an NAND operation between the received respective signals.

An AND element 27 shown in FIG. 2 functions as the correction circuit 7 of FIG. 1. The AND element 27 receives the vertical synchronizing signal $V_{syn}$ and the output of the NAND element 26, and outputs the result obtained by performing an AND operation between the vertical synchronizing signal $V_{syn}$ and the output of the NAND element 26 as the pulse signal VCK.

The number of comparison results to be stored in the memory 5 is not limited to four. It is possible to store a number N of comparison results in the memory 5 if the memory 5 is implemented by a shift register including the number N of D-type flip-flops. In this case, the evaluation circuit 6 may be implemented by an NAND element having the number N of inputs.

Figure 3:
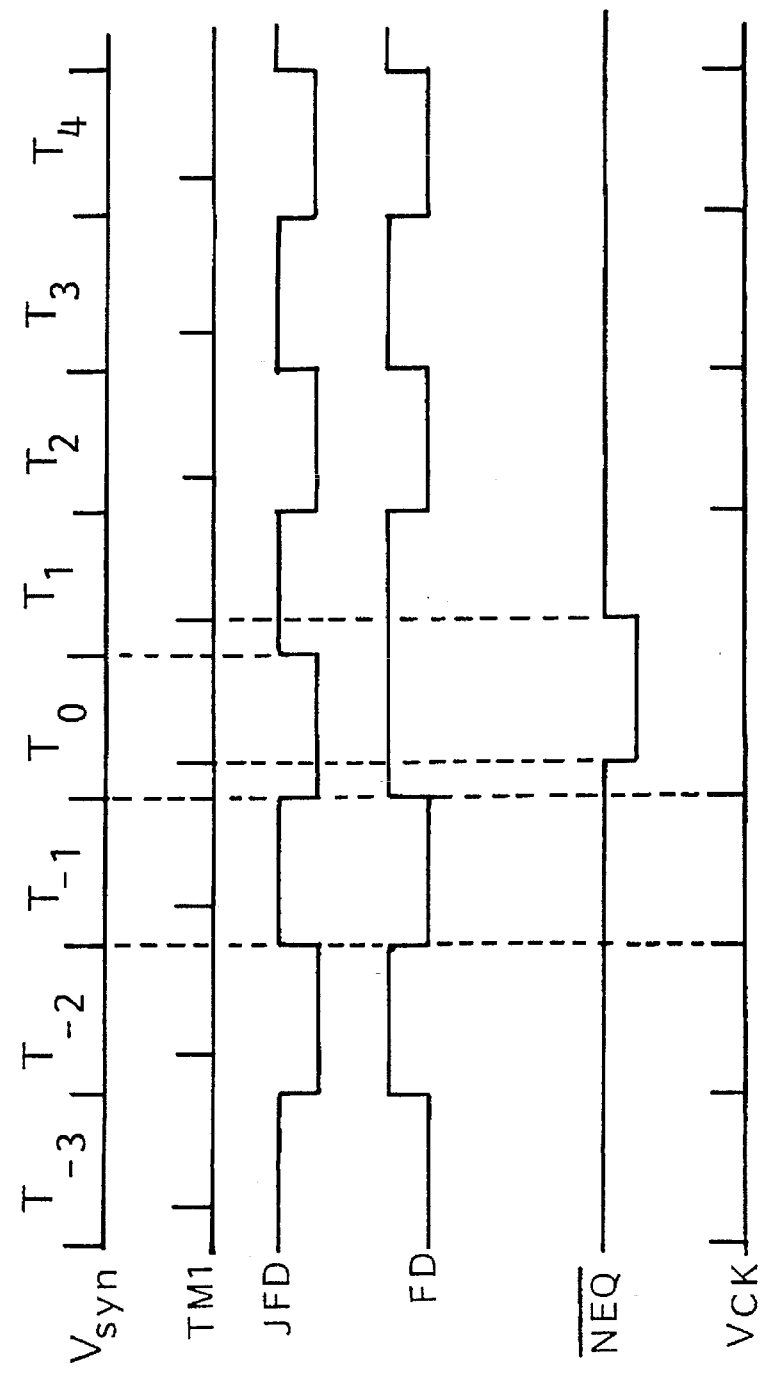
FIG. 3 is a timing chart showing the relationship between signals used in the field decision circuit of FIG. 1.
Figure 4:
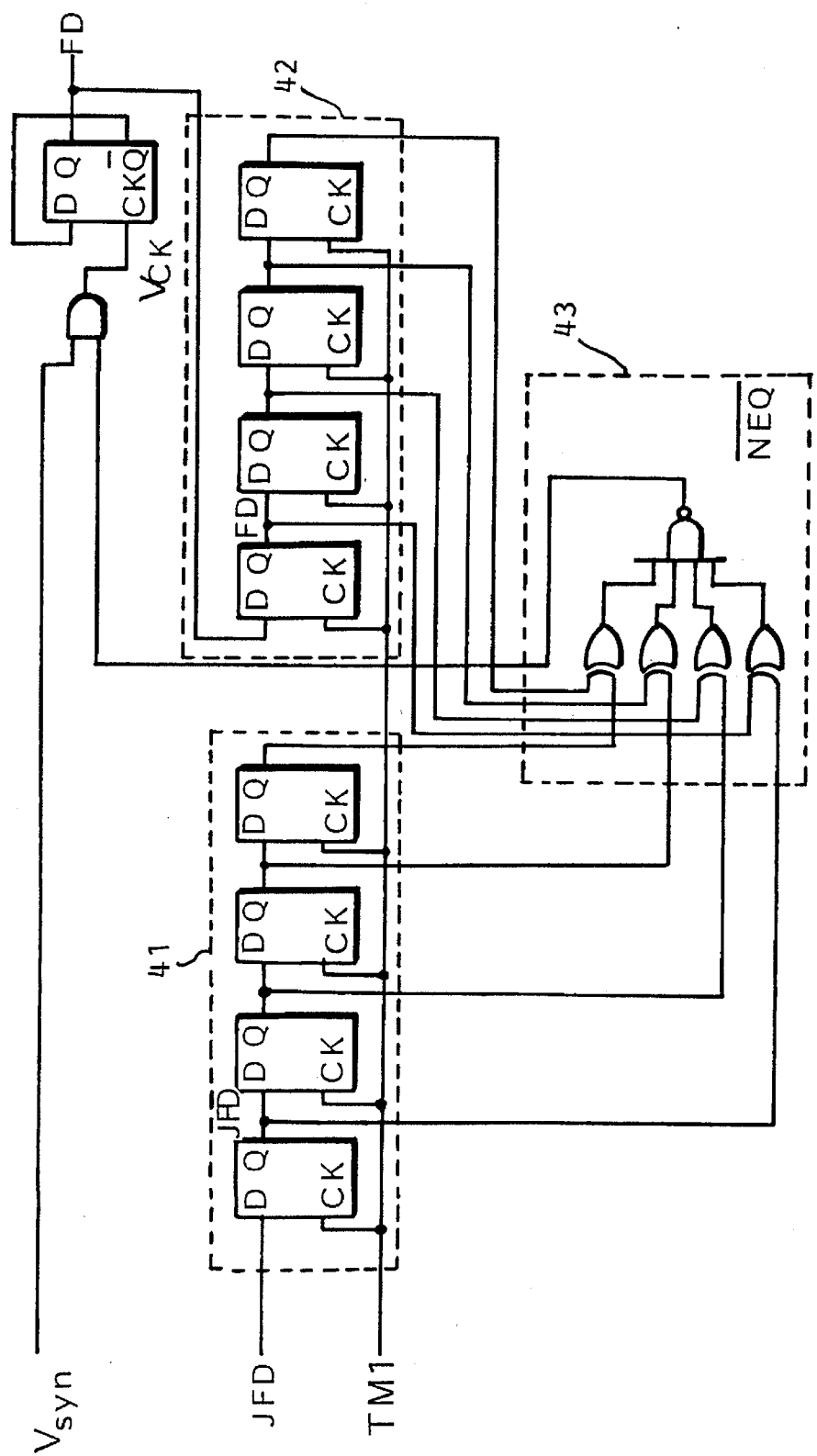
FIG. 4 is a circuit diagram illustrating a structure of a conventional field decision circuit.

FIG. 3 shows waveforms of signals used in the field decision circuit 1. FIG. 3 shows a case where the field information JFD output from the field judgment circuit 2 and the field information FD generation by the field information generating circuit 3 disagree with each other over successive four fields $T_{-3}$ to $T_0$. In this case, the correction circuit 7 does not generates the pulse signal VCK, as is described above. As a result, the field information generating circuit 3 does not invert its output FD at the next field $T_1$. Accordingly, after the field $T_1$, the field information JFD output from the field judgment circuit 2 comes to agree with the field information FD generated by the field information generating circuit 3.

According to the field decision circuit of the present invention, the total number of required elements can greatly be decreased compared with the conventional field decision circuit. For example, the number of memory elements required for the memory 5 of the present invention can be reduced to half of the number of memory elements required for the memories 41 and 42 of the conventional field decision circuit. Furthermore, the four exclusive-OR elements required for the comparator 43 of the conventional field decision circuit can be omitted in the evaluation circuit 6 of the present invention. That is, according to the present invention, even if the number of the field information to be stored in the memory 5 is increased, the number of the exclusive-OR elements required for the evaluation circuit 6 advantageously remains zero. On the other hand, according to the conventional field decision circuit, the number of exclusive-OR elements required for the comparator 43 is increased as the number of the field information to be stored in the memories 41 and 42 is increased.

In addition, according to the present invention, the number of required elements can be decreased, which makes it possible to decrease the number of gates required when the field decision circuit is realized using a gate array as an LSI. For example, the D-type flip-flop used as the memory element can be constituted by 7 gates, the exclusive-OR element can be constituted by 3 gates and the four-input NAND element can be constituted by 2 gates. Accordingly, when assuming that the number of the field information to be stored in the memory 5 is four, the number of required gates can be decreased by 37=(7×4)+(3×3). When assuming that the number of the field information to be stored in the memory 5 is eight, the number of required gates can be decreased by 77=(7×8)+(3×7).

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A field decision circuit, comprising:

a field information generating means for outputting one of a plurality of signals as a first field information for each field, said field information generating means receiving a pulse signal and, in response to said pulse signal, outputting another one of said plurality of signals as said first field information;

a comparison means for receiving said first field information generated by said field information generating means and second field information from an external circuit, and for outputting a comparison result indicating whether said first field information agrees with said second field information for each field;

a memory means for storing a predetermined number of comparison results output from said comparison means over a predetermined number of fields;

an evaluation means for receiving said predetermined number of comparison results stored in said memory means and for outputting an evaluation result obtained by evaluating whether said predetermined number of comparison results satisfy a predetermined relationship; and a correction means for supplying said pulse signal to said field information generating means in accordance with said evaluation result.

2. A field decision circuit according to claim 1, wherein said predetermined number of comparison results are successive comparison results including the latest comparison result.

3. A field decision circuit according to claim 1, wherein said predetermined relationship includes a relationship that said first field information and said second field information disagree with each other over said predetermined number of fields.

4. A field decision circuit according to claim 1, wherein said external circuit includes a field judgment circuit for generating said second field information.

* * * * *